United States Patent [19]

Lemelson

[11] 3,842,433

[45] Oct. 15, 1974

[54] MAGNETIC TAPE DRIVE AND TRANSDUCING METHOD

[76] Inventor: Jerome H. Lemelson, 85 Rector St., Metuchen, N.J. 08840

[22] Filed: Mar. 11, 1974

[21] Appl. No.: 449,601

Related U.S. Application Data

[60] Continuation-in-part of Ser. No. 295,807, Oct. 10, 1972, which is a continuation of Ser. No. 224,131, Feb. 7, 1972, Pat. No. 3,699,266, which is a continuation-in-part of Ser. No. 142,748, Aug. 28, 1961, Pat. No. 3,646,258, which is a division of Ser. No. 515,417, June 14, 1955, Pat. No. 3,003,109.

[52] U.S. Cl. .................................. 360/105, 360/93

[51] Int. Cl. ........................ G11b 5/54, G11b 19/20

[58] Field of Search ........................ 360/92, 93, 105

[56] References Cited

UNITED STATES PATENTS

| | | | |
|---|---|---|---|
| 2,637,560 | 5/1953 | Smith | 360/105 |
| 2,650,830 | 9/1953 | Potter | 360/105 |
| 2,857,164 | 10/1958 | Camras | 360/93 |

*Primary Examiner*—Howard W. Britton

[57] ABSTRACT

A method is provided for operating a tape drive and a transducing means for transducing information relative to a magnetic recording tape wherein the tape drive and transducing means are simultaneously actuated to engage the tape and electromagnetically coupled thereto. In one form, the tape is supported within a housing defining a cartridge and is driven past a transducer which is urged into engagement with the tape in the housing simultaneously as the drive wheel is urged to engage and drive the tape past the transducer.

8 Claims, 2 Drawing Figures

MAGNETIC TAPE DRIVE AND TRANSDUCING METHOD

RELATED APPLICATIONS

Figure 2:
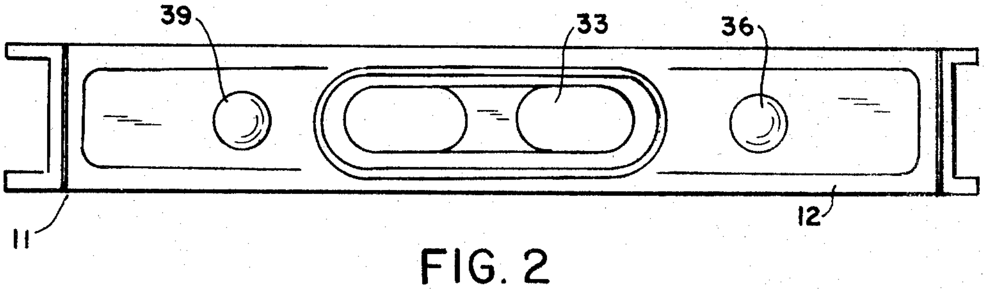

This is a continuation-in-part of application Ser. No. 295,807 filed Oct. 10, 1972, for Scanning System, which was a continuation of application Ser. No. 224,131, filed Feb. 7, 1972, now U.S. Pat. No. 3,699,266, filed as a continuation-in-part of Ser. No. 142,748 which was filed Aug. 28, 1961, now U.S. Pat. No. 3,646,258, as a division of Ser. No. 515,417, filed June 14, 1955, which issued as U.S. Pat. No. 3,003,109.

SUMMARY OF THE INVENTION

This invention relates to a method of transducing information in the form of magnetic recordings provided on a magnetic tape to electrical signals wherein simplified and improved coupling and drive procedures are employed for simultaneously driving and transducing relative to said tape.

Prior to the making of the instant invention, transducing and drive operations relative to a magnetic tape were effected by manually or otherwise moving the tape to the bite of capstan and idler rolls and separately actuating a support for a transducer to move the transducer into engagement with the tape. It is obvious that such techniques are not only complex and time consuming due to the necessity of positioning or threading the tape, but also may subject the tape to manipulations and handling which may result in twisting, stretching, excess wear thereon or even tearing the tape.

The method employed in the instant invention involves a magnetic tape containing one or more recording tracks adapted to be magnetically recorded on and/or reproduced from by driving same at constant speed past one or more transducers. The tape is disposed in a cartridge containing means for guiding same in a fixed path or is otherwise supported and guided to travel past one or more transducers from a supply reel to a take-up reel.

Accordingly, it is a primary object of this invention to provide a new and improved method for driving a magnetic tape and transducing information relative thereto.

Another object is to provide an improved method for simultaneously coupling a drive means to a magnetic tape and a transducing means in a unitary operation whereby the action required to effect transducing is relatively simplified and reduced in time.

Another object is to provide an improved method for driving and transducing relative to a magnetic tape located within a housing or cartridge.

Another object is to provide an improved method for driving a magnetic tape between a supply reel and a take-up reel wherein the tape is supported within a housing defining a cartridge which may be easily replaced or changed.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 1:
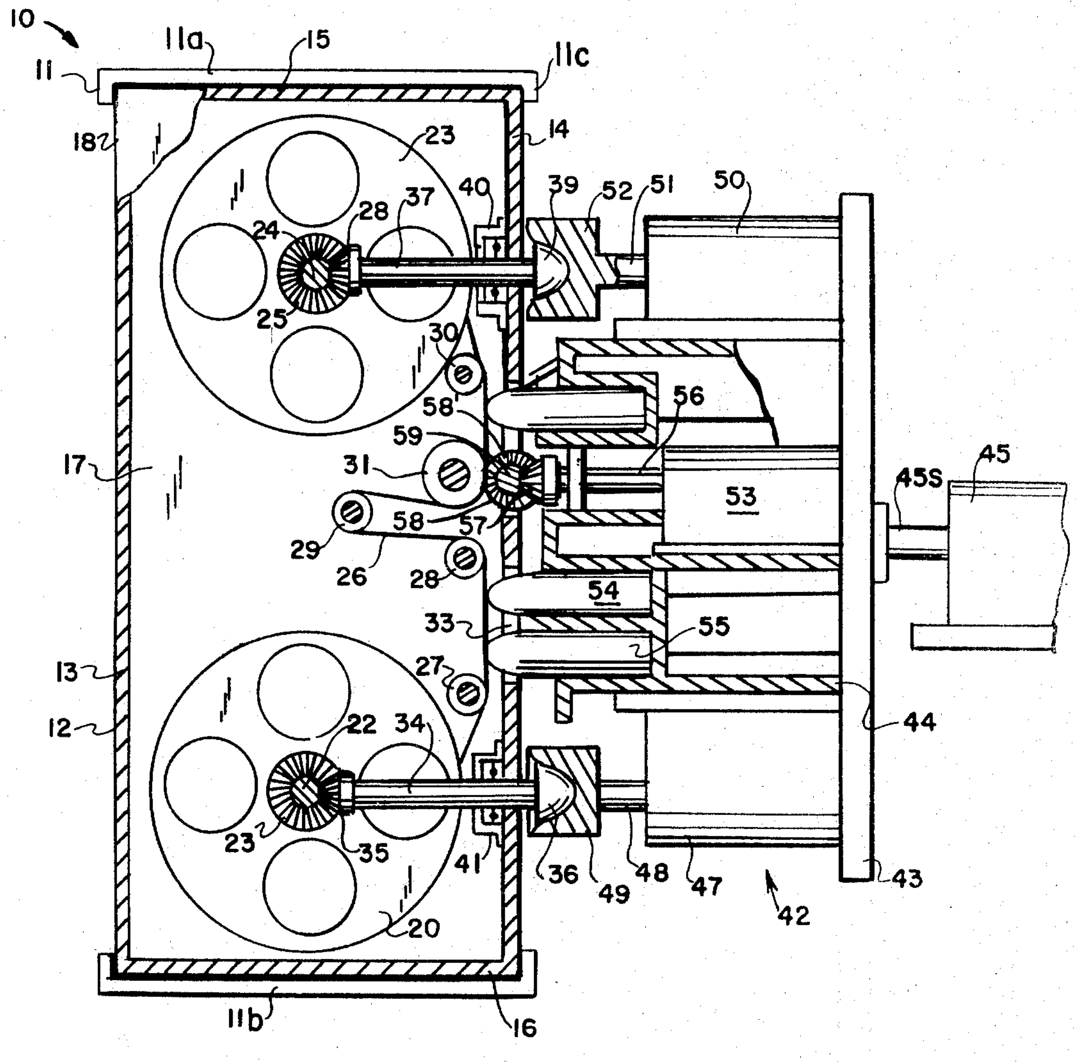

In the drawings:

FIG. 1 is a side view with parts broken away for clarity of a magnetic tape magazine and a combined transducing and drive means for the tape in the magazine, and FIG. 2 is an end view of the magazine of FIG. 1.

There is shown in FIGS. 1 and 2 a magnetic recording and reproduction apparatus 10 comprising a support 11 such as a housing or rack for prepositioning and holding a magazine 12 containing magnetic tape 26 supported and guided therein to travel between a supply reel 20 and a take-up reel 23 both of which are supported for rotation on shafts 22 and 24 by the sidewalls 17 and 18 of the magazine. The support 11 is shown having a plurality of guides **11*a* and 11*b* for predeterminately locating the upper and lower walls of the magazine 12 and a guide or stop 11*c* for longitudinally locating the magazine with respect to a transducing and driving assembly to be described. The magazine 12 is composed of end walls 13, 14, top and bottom walls 15, 16 and said sidewalls 17, and 18 and is substantially rectangular parallelepiped in shape. Magnetic tape 26 is guided by a plurality of cylindrical members or wheels 27 to 31 which are rotationally supported by the sidewalls of the magazine housing in a path parallel and adjacent an opening 33 in the end wall 14.**

Upon prepositioning or securing the magazine 12 on the support 11, a transducing and tape driving assembly 42 is operated to bring one or more transducers into operative engagement with the tape and driving means to engage the tape and reel driving means. Shown extending through openings in end-wall 14 and rotatably supported by bearings 40, 41 supported by said end-wall and bearings not shown supported by the sidewall 18 are respective shafts 34 and 37 containing bevel gears 35 and 38 which engage and mesh with bevel gears 23 and 25 supported by the shafts 21 and 24 which support reels 20 and 23. The latter shafts are rotatably supported by the sidewalls of the magazine 12. Secured to the other ends of shafts 34 and 37 are respective conical coupling members 36 and 39 which serve as means for coupling respective drive means to the shafts.

The tape drive and transducing assembly 42 is composed of a mount 43 which contains a plurality of magnetic heads or transducers 54 and 55 and rotationally supports a cylindrical drive wheel 58 for the tape preferably in alignment with each other and movable together on the common mount 43 so as to simultaneously engage the tape located adjacent the opening 33 in end wall 14. Also shown supported by support or mount 43 are respective motor operated drive units 47 and 50 which contain respective coupling devices 49 and 52 supported at the ends of their drive shafts 48 and 51 and located to engage the shaped coupling members 36 and 39 at the ends of shafts 34 and 37 when the assembly 42 is operatively located, as shown, with respect to the magazine 12. Drive unit 50 is operable to drive the take-up reel 23 to take up tape as it is fed by the driving action of drive wheel 58 engaging the tape against wheel 31. The drive unit or motor 50 preferably contains a slip clutch or tension responsive means to draw the tape onto reel 23 without driving it from between wheels 31 and 58 or overstretching same.

A third reversible motor 53 is a constant speed motor which is also supported by mount 43 and has a bevel gear 57 secured to the end of its output shaft 56 which gear engages the teeth of a second bevel gear 58' secured to a shaft 59 which is supported in bearing by the housing 44 enclosing the assembly 42. Shaft 59 supports the tape drive wheel or capstan wheel 58 which is driven in rotation by motor 53 and is located in mount 43 so as to engage the tape 26 against a wheel 31 which is supported in rotation by the sidewall of the magazine behind the tape and serves as a depressor wheel permitting the capstan wheel to drive the tape in either direction past the heads. When the tape 26 is driven from reel 20 to reel 23, constant speed motor 53 is operable to rotate wheel 58 clockwise and the motor of unit 50 is energized to drive reel 23 to wind the tape thereon while reel 20 is permitted to freely play out tape by deactivating drive 47. To drive the tape 26 onto reel 20, motor 47 is operated while motor 50 is retained inoperable with its output shaft 51 free to turn so that reel 23 may play out tape to reel 20.

Also shown in FIG. 1 is an actuator 45 for the mount 43 containing the magnetic heads and the drive motors. The actuator may comprise a bistable solenoid or motor driven mechanism shown with its output 45S directly connected to the mount 43. When shaft 45S is projected as shown and a magazine is in the operative location illustrated, the magnetic heads 54, 55 are urged into engagement with the tape 26 in the magazine, while the drive wheel 58 is positioned against the tape compressing it against wheel 31 and the coupling devices 49 and 52 of motors 47 and 48 are engaged with coupling members 36 and 39 of the magazine.

In one mode of operation, drive units 50 and 53 are simultaneously operated to cause the tape to be driven at substantially constant speed past the transducers onto take-up reel 23. In another operative mode, the motor 53 is reversed and the motor of drive unit 47 is energized to drive the tape back onto reel 20 at the end of a transducing operation.

It is also noted that the mount 43 for the tape drive and transducing assembly 42 may be pivotally supported on a housing or base such as support 11 and actuated by a solenoid, motor or other means to pivotally engage the illustrated coupling devices into and out of operative relations with the corresponding driven members of the magazine 12 as well as the illustrated transducers into and out of operative relationship with tape 26 as shown.

I claim:

1. A method of transducing information relative to a magnetic tape comprising:

guiding a length of elongated magnetic tape in a fixed path, which path is located closely adjacent to a first rotatable cylindrical member disposed on one side of said tape at a location whereby said cylindrical member is capable of engaging said tape, movably supporting a common mount for a transducer adjacent said fixed path, which transducer is operable for magnetically transducing signals relative to said tape when in engagement with said tape, and rotatably supporting a second cylindrical member on said common mount adjacent to said transducer and a fixed distance therefrom, first disposing said common mount for said transducer and said second cylindrical member at a first location to provide said transducer away from but in direct alignment with a free length of said tape disposed along said fixed path with said second cylindrical member located by said common mount in direct alignment with said first cylindrical member and just off said tape, moving said common mount for said transducer and said second cylindrical member a predetermined distance towards said tape to cause said transducer to engage and become operatively coupled to said tape and to simultaneously cause said second cylindrical member to engage and pinch said tape against said first cylindrical member, and power rotating one of said first and second cylindrical members while said tape is pinched therebetween and the other cylindrical member to drive said tape past said transducer so as to permit transducing operations to be performed relative to said tape.

2. A method in accordance with claim 1 which includes relatively locating said common mount with respect to said first rotatable cylindrical member such that when said mount is disposed to provide said transducer away from said free length of said tape, said second cylindrical member will be disposed thereby just off said tape and in direct alignment with said first rotatable cylindrical member substantially the same distance away from said tape as said transducer.

3. A method in accordance with claim 1 wherein said magnetic tape is supported by and guided within a container therefor, said method further including removably supporting said container relative to said common mount for said transducer and said second cylindrical member on a further support with respect to which further support said common mount is movable.

4. A method in accordance with claim 1 wherein said common mount for said transducer and said second cylindrical member is supported for lineal movement towards and away from said free length of said magnetic tape, said method including lineally moving said common support from a retracted position wherein said transducer and said second cylindrical member are each disposed on said mount substantially the same distance away from said tape to an advanced position wherein said transducer and said second cylindrical member each substantially simultaneously engage said tape.

5. A method in accordance with claim 3 wherein said tape is fed between a supply reel and a take-up reel which reels are rotatably supported within said container, said method further including coupling said take-up reel to a drive means therefor and activating said drive means substantially simultaneously as one of said first and second cylindrical members is power rotated so as to take up the tape driven between said first and second cylindrical members onto said take-up reel within said container.

6. A method in accordance with claim 5 wherein said coupling between said take-up reel and said drive means for said take-up reel is effected substantially simultaneously as said transducing means is caused to engage said tape.

7. A method in accordance with claim 5 wherein said coupling between said take-up reel and said drive means for said take-up reel is effected substantially simultaneously as both said transducing means and said second cylindrical member engage said tape.

8. A method of transducing information relative to a record tape comprising:

guiding a length of elongated record tape in a fixed path, which path is located closely adjacent to a first rotatable cylindrical member disposed on one side of said tape at a location whereby said cylindrical member is capable of engaging said tape, movably supporting a common mount for a transducer adjacent said fixed path, which transducer is operable for scanning said tape and transducing the information scanned to electrical signals as said tape is driven past said transducer, and rotatably supporting a second cylindrical member on said common mount adjacent to said transducer and a fixed distance therefrom, first disposing said common mount for said transducer and said second cylindrical member at a first location to provide said transducer away from but in direct alignment with a free length of said tape disposed along said fixed path with said second cylindrical member located by said common mount in direct alignment with said first cylindrical member and just off said tape, moving said common mount for said transducer and said second cylindrical member a predetermined distance towards said tape to cause said transducer to be operably positioned for scanning said tape and to simultaneously cause said second cylindrical member to engage said tape against said first cylindrical member, and power rotating one of said first and second cylindrical members while said tape is engaged therebetween and the other cylindrical member to drive said tape longitudinally past said transducer so as to permit transducing operations to be performed relative to said tape.

* * * * *

UNITED STATES PATENT AND TRADEMARK OFFICE

CERTIFICATE OF CORRECTION

PATENT NO. : 3,842,433

DATED : October 15, 1974

INVENTOR(S) : Jerome H. Lemelson

It is certified that error appears in the above-identified patent and that said Letters Patent is hereby corrected as shown below:

The term of this patent subsequent to May 12, 1987, has been disclaimed.

Signed and Sealed this

Thirty-first Day of May, 1988

*Attest:*

DONALD J. QUIGG

*Attesting Officer* *Commissioner of Patents and Trademarks*

REEXAMINATION CERTIFICATE (1265th)

United States Patent [19] [11] B1 3,842,433

Lemelson [45] Certificate Issued May 8, 1990

[54] MAGNETIC TAPE DRIVE AND TRANSDUCING METHOD

[76] Inventor: Jerome H. Lemelson, 85 Rector St., Metuchen, N.J. 08840

Reexamination Request:
No. 90/001,608, Sep. 26, 1988

Reexamination Certificate for:

| | |
|---|---|
| Patent No.: | **3,842,433** |
| Issued: | **Oct. 15, 1974** |
| Appl. No.: | **449,601** |
| Filed: | **Mar. 11, 1974** |

Certificate of Correction issued May 31, 1988.

Related U.S. Application Data

[60] Continuation-in-part of Ser. No. 295,807, Oct. 10, 1972, which is a continuation of Ser. No. 224,131, Feb. 7, 1972, Pat. No. 3,699,266, which is a continuation-in-part of Ser. No. 142,748, Aug. 28, 1961, Pat. No. 3,646,258, which is a division of Ser. No. 515,417, Jun. 14, 1955, Pat. No. 3,003,109.

[51] Int. Cl.[5] .............................................. G11B 21/02
[52] U.S. Cl. .................................. 360/105; 360/26.3; 360/93
[58] Field of Search ......................... 360/105, 93, 96.5

[56] References Cited

FOREIGN PATENT DOCUMENTS 712536 7/1954 United Kingdom ............... 360/96.1

*Primary Examiner*—A. J. Heinz

[57] ABSTRACT

A method is provided for operating a tape drive and a transducing means for transducing information relative to a magnetic recording tape wherein the tape drive and transducing means are simultaneously actuated to engage the tape and electromagnetically coupled thereto. In one form, the tape is supported within a housing defining a cartridge and is driven past a transducer which is urged into engagement with the tape in the housing simultaneously as the drive wheel is urged to engage and drive the tape past the transducer.

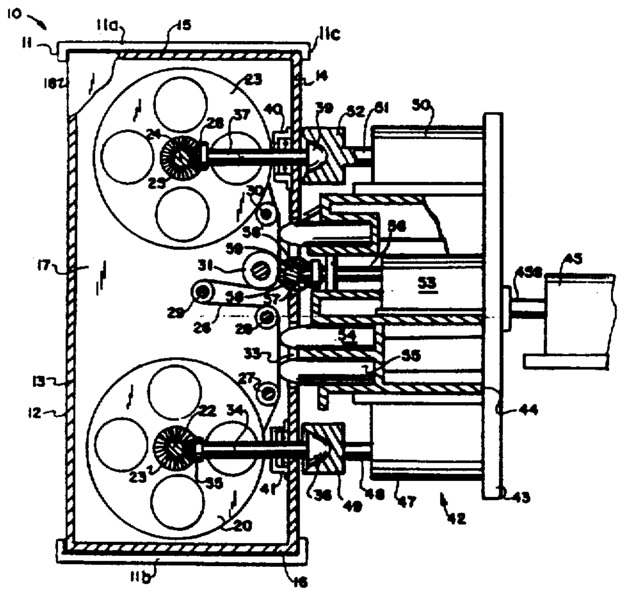

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–8 are cancelled.

* * * * *